United States Patent Office 3,545,967

Patented Dec. 8, 1970

3,545,967

METAL-SEMICONDUCTOR ALLOYS FOR THIN-FILM RESISTORS

Robert P. Mandal, Valinda, Calif., assignor to Aerojet-General Corporation, El Monte, Calif., a corporation of Ohio No Drawing. Filed Sept. 28, 1966, Ser. No. 582,499

Int. Cl. C22c *15/00, 31/00;* H01b *1/02*

U.S. Cl. 75—134 7 Claims

ABSTRACT OF THE DISCLOSURE

This patent describes a novel solid evaporated thin-film resistor having uniform operating characteristics up to at least 150° F. comprising an alloy of a high melting metal which is not a semiconductor with an elemental semiconductor of high melting point; said metal and said semiconductor having similar vapor pressures at the evaporation temperature as indicated by uniformity of composition in the liquid and vapor states. The method of preparing novel solid evaporated thin-film resistors having uniform operating characteristics up to at least 150° F. which comprises heating to melting a finely divided high melting metal which is not a semiconductor and a finely divided high melting elemental semiconductor to form an alloy, evaporating said alloy onto a substrate, heated to a temperature at least 25° C. above the intended operating temperature of said resistor, and permitting said alloy to solidify and cool on said substrate in the form of a thin film.

This invention relates to novel metal-semiconductor alloys for thin-film resistors and to the preparation of the same.

The standard thin-film resistor in industry today is Nichrome containing about 20% chromium and 80% nickel. The Nichrome film resistors are characterized by extreme sensitivity to resistor thickness. Moreover, the composition is very difficult to control since the constituents of Nichrome evaporate at greatly different temperatures, that is, have very dissimilar vapor pressures, requiring elaborate and inconvenient measures which must be taken in order to control the resistor composition. In addition, the Nichrome film resistors are inherently unstable so that their resistance typically drifts upward about 100% before the resistor is satisfactorily stabilized in resistance.

Previously, it has also been proposed to prepare rhodium-germanium evaporated thin-film resistors. However, these two materials have such dissimilar vapor pressures at the evaporation temperature that the germanium deposited first is in substantially pure form followed by a deposit of rhodium. The desired diffusion is obtained only by the subsequent heat after treatment of the two-layer deposit. This method is inconvenient in practice, and more important, is almost impossible to operate in a manner which will give uniform thin-film resistors.

The present invention is concerned primarily with the provision of a class of novel evaporated thin-film resistors. More particularly, the present invention is concerned with the provision of novel materials which can be evaporated from a single source with good composition control to yield high-value resistors and provide significant improvement over Nichrome and other similar presently available materials.

Accordingly, it is a principal object of the present invention to provide for a novel class of materials well suited for the fabrication of evaporated thin-film resistors.

This invention also has as an object a method for the deposition of a class of materials for evaporated thin-film resistors.

Yet another object of the present invention is the fabrication of stable very highly resistive films with low temperature coefficients of resistance.

Yet another object of the present invention is the provision of materials which can be evaporated from a single source of alloy with good composition control.

In another aspect, it is an object of the present invention to provide novel thin-film resistor alloys wherein a metal is alloyed with a semiconductor, said metal and said semiconductor having similar vapor pressures.

These and other objects and advantages of the present invention will become apparent from the more detailed description which follows.

Briefly, the present invention comprises a novel class of evaporated solid thin-film resistors having a uniformity of operating characteristics at a temperature of at least 150° F., and preferably up to about 400° F., comprising a binary or ternary alloy of a high melting metal with an elemental semiconductor of high melting point. The high melting metal alloyed with each semiconductor has a similar vapor pressure to the semiconductor material utilized so that at the evaporation temperature, the liquid and equilibrium vapor phases are of substantially identical composition. In this connection, it should be noted that it is not necessary that an exact matching of vapor pressure be achieved, so long as excessive fractionation of components does not take place upon heating of the alloy. In general, the ratio of the vapor pressure of the semiconductor to that of the metal, measured at the evaporation temperature, should be less than about 4 to 1. The semiconductors and metals utilized in this invention generally have melting points above about 1200° K. since the lower melting materials have been found to give resistors of poor stability at high operating temperatures. The present invention also includes a novel method for the vacuum deposition of these alloys to provide upon solidification evaporated thin-film resistors. Typical suitable high melting elemental semiconductors include germanium, silicon, carbon and boron. Preferred metals for use in this invention include iron, chromium, zirconium, rhodium and osmium.

Examples of binary alloys suitable for evaporated thin-film resistor fabrication according to this invention are as follows:

(A)

| | Percent by weight |
|---|---|
| Chromium | 41.7 |
| Germanium | 58.3 |

(B)

| | |
|---|---|
| Chromium | 26.4 |
| Germanium | 73.6 |

(C)

| | |
|---|---|
| Chromium | 14.8 |
| Germanium | 82.9 |
| Iron | 2.3 |

(D)

| | |
|---|---|
| Zirconium | 80.8 |
| Boron | 19.2 |

As will be apparent to those skilled in the art, various other binary and ternary alloys of similar composition may be prepared according to the present invention, based upon the foregoing vapor pressure criteria. Typical of other alloys within the scope of my invention are iron-germanium, neodymium-silicon, chromium-silicon, rhodium-boron, niobium-carbon, and osmium-carbon.

These resistor compositions are fabricated by heating the appropriate weight quantities of the pure mixed finely divided chemical elements in a high vacuum or an inert gas atmosphere such as argon, in a refractory metal crucible. The ideal method of preparation is to heat the pure mixed finely divided chemical elements in a water-cooled refractory metal crucible under high vacuum, normally about $10^{-5}$ mm. Hg using electron-beam heating or radio-frequency heating to achieve alloying.

In each case, evaporation takes place from the intermetallic alloy; composition of evaporated material is automatically controlled by chemical binding forces and similarity of vapor pressures, giving reproducible, constant composition control. Due to the electrically-resistive nature of the intimately and homogeneously-mixed semiconductor atoms, very highly-resistive films can be fabricated with resistivities several times greater than that of commercially available nichrome. In general, the novel alloys described above can be prepared by heating pre-measured quantities of the mixed elements until alloying takes place.

In general, to obtain thin-film resistors, thermal vacuum evaporation of the alloy onto an insulating substrate is employed. For high stability of resistor resistance, substrate temperature during vacuum deposition should be adjusted to at least about 25° C. above the highest temperature to which the resistor will be subsequently subjected. For example, for an array of resistors designed with a storage and/or environmental temperature range of —75° C. to 125° C., substrate temperature during resistor deposition should be held at a minimum of 150° C. during deposition. In general, a vacuum of $5\times10^{-6}$ torr or better, during deposition, is advisable. A clean substrate, free of hydrocarbons and particulate matter is essential for the deposition of the thin-film resistors.

According to the present invention, it has been found that, by using the resistor compositions of this invention, there is provided a unique combination of properties of the corresponding deposited thin-film resistors which may be vacuum deposited at a thickness range from about 50 to about 1000 angstroms. This combination includes resistivity, stability, temperature coefficient of resistivity, and depositability.

While not necessary, it has been found that for best results, the thin-film resistors prepared in accordance with the present invention are thereafter covered with a protective coating against environmental hazards. Typical of such suitable inert protective coatings are silicon monoxide, silica, and alumina.

The following examples are presented solely to illustrate the invention and should not be regarded as limiting in any way. In the examples, the parts and percentages are by weight unless otherwise indicated.

EXAMPLE I

A substrate was first cleaned and then heated to a temperature of about 150° C. under a vacuum of $5\times10^{-6}$ torr. Thereafter, a mixture of about 41.7% chromium and 58.3% germanium was heated in a refractory metal crucible until a binary alloy was formed. No fractionation of components was noted. Heating was accomplished by use of an electron beam. The alloy within the vacuum formed a thin film on the substrate having a thickness of about 100 angstroms. After cooling, it was found that the thin-film resistor thus formed had a resistivity of about 350 $\mu$ ohm cm., and a temperature coefficient of resistivity of 0 to 50 p.p.m./° C.

Depositability of this alloy was so ideal that it can be deposited from a resistive heated source or from an electron beam heated source and from other sources with little or no change of composition during the course of evaporation. Inherent stability is unexcelled, as demonstrated by the fact that resistors deposited at room temperatures drift less than 1% at room temperature according to plots with extrapolations estimated out to infinite time.

Commercial Nichrome film resistors were compared with the composition of Example I, and the following observations were made: The temperature coefficient of resistivity of Nichrome can be adjusted to the same range as the material of Example I, but is extremely sensitive to resistor thickness and composition and is very difficult to control. Moreover, since the constituents in Nichrome evaporate at greatly different temperatures, it was found that elaborate and inconvenient measures must be taken to achieve control over resistor composition. In addition, the inherent stability of Nichrome is so poor that resistance typically drifts up about v00% before the resistor is satisfactorily stabilized in resistance.

EXAMPLE II

A substrate was first cleaned and then heated to a temperature of about 150° C. under a vacuum of $5\times10^{-6}$ torr. Thereafter a mixture of about 14.8% chromium and 82.9% germanium in iron 2.3% was heated in a refractory metal crucible until a binary alloy was formed. No fractionation was noted. Heating was accomplished using an electron beam. The alloy formed on the substrate within the vacuum in the form of a thin film having a thickness of about 100 angstroms. After cooling, it was found that the thin-film resistor thus formed had a resistivity of about 10,000 $\mu$ ohm cm., and a temperature coefficient of resistivity of 3000 p.p.m./° C. Again, little or no change of composition was noted during the course of evaporation.

The composition of Example II was found to have a resistivity of approximately 10,000$\mu$ ohm cm., a region inaccessible to any other class of resistor composition other than cermets. In this connection, it should be noted that the cermets are difficult to fabricate and are not susceptible to vacuum deposition.

EXAMPLE III

Following the procedure of Example I, a thin film alloy was formed containing 48.1% chromium and 51.8% silicon. The properties of this material are as follows: resistivity, 900 ohm cm., temperature coefficient, 100 parts per million/° C.; stability, drift of about 2% when deposited at room temperature and less than 0.1% when deposited at 150° C.

As can be seen from the foregoing, the present invention provides for the deposition of a novel class of evaporated thin-film resistors. Stable very highly resistive films can be fabricated according to the present invention having resistivities several times greater than that of Nichrome, with low tempertaure coefficients of resistance. In addition, the mateirals used in the present invention can be evaporated from a single source of alloy with good composition control. The properties of the novel thin films of the present invention are very desirable for the fabrication of high-value resistors, as will be apparent to those skilled in the art, and give a significant improvement over materials and processes presently in use. Thus, the thin-film resistors of the present invention will find many uses in the field of electronics and the like. In addition, these resistors will find many new applications, for example, in re-entry nose cones, because of their uniform characteristics at elevated temperatures.

Having fully described the invention, it is intended that it be limited only by the lawful scope of the appended claims.

I claim:

1. Novel solid evaporated thin-film resistors having uniform operating characteristics up to at least 150° F. comprising an alloy of a high melting metal which is not a semi-conductor with an elemental semiconductor of high melting point; said metal and said semiconductor having similar vapor pressures at the evaporation temperature as indicated by uniformity of composition in the liquid and vapor states.

2. The novel evaporated thin-film resistors of claim 1 wherein the ratio of the vapor pressure of the semiconductor to the metal at the evaporation temperature is less than about 4 to 1.

3. The novel evaporated thin-film resistor of claim 1 wherein the metal is 41.7% by weight chromium and the semiconductor is 58.3% by weight germanium.

4. The novel evaporated thin-film resistor of claim 1 wherein the metal is 26.4% by weight chromium and the semiconductor is 73.6% by weight germanium.

5. The novel evaporated thin-film resistor of claim 1 wherein the metal is 80.8% by weight zirconium and the semiconductor is 19.2% by weight boron.

6. The novel evaporated thin-film resistor of claim 1 wherein the metals are 14.8% by weight chromium and 2.3% by weight iron, and the semiconductor is 82.9% by weight germanium.

7. The novel evaporated thin-film resistor of claim 1 having a thickness of from 50 to 1000 angstroms.

References Cited

UNITED STATES PATENTS

| | | | |
|---|---|---|---|
| 2,552,626 | 5/1951 | Fisher et al. | 75—134.7UX |
| 2,588,253 | 3/1952 | Lark-Horovitz et al. | 75—134.7X |
| 2,831,784 | 4/1958 | Gastinger | 75—134.7X |
| 3,244,557 | 4/1966 | Chion et al. | 75—134X |
| 3,347,719 | 10/1967 | Heywang | 148—186X |
| 3,381,255 | 4/1968 | Youmans | 252—512X |

OTHER REFERENCES

Jaffee et al.: "Technology of Germanium" Trans Amer. Electrochem. Soc., vol. 89, p. 288 (1946).

Elliott.: "Constitution of Binary Alloys, First Supplement," N.Y., McGraw-Hill, 1965, p. 348.

L. DEWAYNE RUTLEDGE, Primary Examiner

G. K. WHITE, Assistant Examiner

U.S. Cl. X.R.

29—183.5; 75—177; 252—512